United States Patent
Tran

(10) Patent No.: US 12,476,752 B2
(45) Date of Patent: Nov. 18, 2025

(54) METHOD AND SYSTEM FOR WIRELESS COMMUNICATION USING IMPROVED LONG RANGE WIRELESS AREA NETWORK PROTOCOL

(71) Applicant: Vinh Quang Tran, Hanoi (VN)

(72) Inventor: Vinh Quang Tran, Hanoi (VN)

(73) Assignee: HANOI UNIVERSITY OF SCIENCE AND TECHNOLOGY, Ha Noi (VN)

( * ) Notice: Subject to any disclaimer, the term of this patent is extended or adjusted under 35 U.S.C. 154(b) by 443 days.

(21) Appl. No.: 17/837,205

(22) Filed: Jun. 10, 2022

(65) Prior Publication Data

US 2022/0311567 A1    Sep. 29, 2022

(30) Foreign Application Priority Data

Oct. 5, 2021 (VN) ............... 1-2021-06206

(51) Int. Cl.
| | | |
|---|---|---|
| *H04L 5/00* | (2006.01) | |
| *H04L 1/00* | (2006.01) | |
| *H04W 4/021* | (2018.01) | |
| *H04W 28/02* | (2009.01) | |
| *H04W 88/16* | (2009.01) | |

(52) U.S. Cl.
CPC .......... *H04L 5/0044* (2013.01); *H04L 1/0061* (2013.01); *H04L 5/0053* (2013.01); *H04W 88/16* (2013.01)

(58) Field of Classification Search
CPC .... H04W 88/16; H04L 5/0044; H04L 5/0053; H04L 1/0061
See application file for complete search history.

(56) References Cited

U.S. PATENT DOCUMENTS

| | | | | |
|---|---|---|---|---|
| 10,560,562 | B1* | 2/2020 | Tandon ................. | H01Q 21/28 |
| 2018/0234970 | A1* | 8/2018 | Hall ................. | H04W 72/0453 |
| 2018/0352569 | A1* | 12/2018 | Hall ..................... | H04L 5/0055 |
| 2019/0053180 | A1* | 2/2019 | Lalam .................. | H04W 72/20 |
| 2020/0068390 | A1* | 2/2020 | Knapp ................. | H04W 12/04 |
| 2020/0100157 | A1* | 3/2020 | Teboulle ................ | H04L 67/12 |
| 2020/0100158 | A1* | 3/2020 | Teboulle ............... | H04L 63/062 |
| 2021/0149803 | A1* | 5/2021 | Bernat .................... | G06F 3/061 |
| 2021/0176667 | A1* | 6/2021 | Chen .................... | H04L 5/0091 |
| 2021/0337355 | A1* | 10/2021 | Sobol ................... | H04W 4/023 |
| 2023/0325171 | A1* | 10/2023 | Chapuis ............... | B61L 23/042 |
| | | | | 717/172 |

FOREIGN PATENT DOCUMENTS

CN     107547521 B   *   2/2020   ............ H04L 29/06

OTHER PUBLICATIONS

Erturk M. A, Aydin M. A, Buyukakkaslar M. T, Evirgen H. A Survey on LoRaWAN Architecture, Protocol and Technologies. Future Internet. Oct. 17, 2019; pp. 1-34. (Year: 2019).*

* cited by examiner

*Primary Examiner* — Jenee Holland

(57) ABSTRACT

The present invention relates to a method and a system for wireless communication. A method and a system according to the present invention is implemented by a node, a gateway, and a server. The nodes and the gateway communicating with each other via an improved LoRaWAN protocol for extending further functions of the gateway, such as data processing or the same, result in computing requirements decreasing at the server, reducing in time and several communicating procedures among network components, thus enhancing the efficiency for using network resources.

13 Claims, 4 Drawing Sheets

METHOD AND SYSTEM FOR WIRELESS COMMUNICATION USING IMPROVED LONG RANGE WIRELESS AREA NETWORK PROTOCOL

TECHNICAL FIELD

The present invention relates to a method and a system for wireless communication, and more particularly, a method and a system for wireless communication using an improved LoRaWAN protocol for enhancing efficiency in communication and in using network resources.

BACKGROUND

As prior knowledge, LoRa is a wireless technology developed to be transmittable data via a long distance with relatively low energy consumption, which is spreadly used in IoT (Internet of Things) applications, capable to maintain the connectivity and operation of nodes within a long duration while only using energy from batteries.

A LoRa network is capable to provide network coverage similar to that of a mobile network. Thus, the LoRa technology is considered advantageous for use in various different applications, including: intelligent quantification, inventory tracking, vending machine data monitoring, automobile industry, utility applications, and in any field which requires data report and control.

Furthermore, LoRaWAN (Long Range Wireless Area Network) is developed as a systematic structure and a communication protocol in a LoRa-based network, wherein LoRaWAN provides strict rules in the network protocol and architecture, are factors which have a significant impact for energy saving to increase the lifetime of nodes, while still ensuring network capacity, service quality, security level, and various applications are served by the network.

In general, as shown in FIG. 4, the structure of LoRaWAN includes four main components, as described hereafter.

Nodes: including one or more devices equipped with sensor to encode collected data into data packets (or may be called as messages), then sending to a gateway.

Gateway: takes a role as an intermediate device used for making a connection between nodes and a server. In practical communication applications, a gateway may receive a plurality of data packets from different nodes, the gateway is to make an arrangement of received data packets, then forwarding/relaying them to the server for processing at the server.

Server: or may be called as a network server, is a control center, managing data packets. Because a system may often have a plurality of gateways, these gateways may receive duplicate packets sent from nodes or there may be delays in receiving packets, not simultaneously. Therefore, the server may be configured to wait for the packets are sufficiently received, then comparing to remove the duplicate packets, and finally decoding the packets into data types which users require.

Application servers: may be a website server or a mobile application server, or any device which allows one to run a certain application where information of the related data are displayed for user.

In the structure of LoRaWAN above, nodes are to communicate with the gateway by a method of multiple access, is called as ALOHA protocol. Thus, nodes will not to connect with a specific gateway, but wherein messages from each node will be broadcasted to all gateways, and turning to gateways they will forwarding all messages which the gateways have received to server. Therefore, there will be a vast range of duplicate messages sent to the server that makes the server and gateway performance significantly reduced because they have to spend a part of the resource for modulating, demodulating, and processing those duplicate messages, and the network bandwidth is also wasted to transmit the duplicate messages.

In addition, as for the LoRaWAN protocol, the server currently handles quite a lot of tasks, such as: OTAA (Over-The-Air-Activation), removing duplicate data packets, routing for messages, response speed control, acknowledgement of messages, etc. This may cause the server to be overload, slow down the response and may degrade in operating performance during certain periods of time.

Furthermore, in the typical structure of LoRaWAN, the network registration processes and the sending messages are encoded. Nodes using network section key (Network Section Key—NwkSKey, used for MAC data load) and application section key (Application Section Key—AppSKey, used for application data load), according to the AES-128 encryption standard, for encoding the message from node sending to the server and the application server. All messages are decoded at the network server and are processed at the server. So, the gateway in the mentioned structure of the above LoRaWAN does not know encryption keys and totally operates as a role of a relaying station. That is, in the structure of LoRaWAN, the rules are not provided to define the gateways to include the functionalities of processing, calculating tasks, even though they are equipped with favorable processors capable to satisfy highly calculating requirements.

As such, in the typical structure of LoRaWAN itself, there remain two problems, that is, to remove the duplicate packets at the network server and to provide additional rules in the network structure so that gateway(s) may be capable of calculation to operate as a role which may undertake at least a part of calculating and processing tasks in the network, resulting in decreasing the requirements at the network server and increasing the efficiency of the network.

In several applications which use LoRaWAN, such as a technical solution in a patent publication document No. U.S. Ser. No. 10/567,495 B2. As disclosed in this document, when nodes send their data packets to a gateway, gateways may not directly forward said data packets to network server; instead of that, the gateway may send the data packets via another gateway, called as a primary gateway which forwards the data packets to the server. This results not only in time and forwarding hop number increased in the whole network, but also generating network procedures between the gateways to identify which among the gateways become the primary gateway for a group of its relative gateways. In addition, the relationship between a node and a gateway is not a one-to-one relationship, so that if there is a certain node which is unable to communicate with a gateway, the said gateway may understand that the said node may communicate with other gateways or devices while the node may actually not communicate with any gateway at all. This may lead to a situation in which the operating status of nodes may be not updated fully, or may be difficult to access node information in several specific scenarios.

In other different applications which use LoRaWAN, such as technical solutions in Chinese publication documents No. CN 110891330 A and No. CN 209692795 U. As disclosed in these documents, the gateways are mentioned as devices capable to support for edge computing, that is intended to carry out some processing and computing tasks at the gateway. However, those documents do not provide clearly instructions or explanations or modifications of the structure of LoRaWAN, which means that the gateways are deemed not to know the encryption keys related to encoding data sent from nodes via LoRaWAN, this leads to processing, computing tasks at the gateway are significantly limited and difficult to carry out some processing, computing tasks over data which require to 'understand' what the data content being, due to the gateway being unable to decode encoding data packets and may not distinguish the content of data included a packet or among different packets that have sent from the nodes via LoRaWAN.

Therefore, it is necessary to improve the structure of LoRaWAN applied to the wireless communication network to further enhancing the efficiency in communication and use network resources.

SUMMARY

An object of the present invention is to provide a method and a system for wireless communication, may overcome one or more above mentioned problems.

An other object of the present invention is to provide a method and a system for wireless communication, may favorably remove duplicate data packets and minimize the number of messages used in the network.

Yet another object of the present invention is to provide a method and a system for wireless communication, using an improved LoRaWAN-based structure, may result in the gateway favorably carry out processing and computing tasks, such that the processing requirements for the server reduces.

Still another object of the present invention is to provide a method and a system for wireless communication, capable to favorably customize and expand a network, and may remove communicating procedures among gateways.

Various objects to be achieved by the present invention are not limited to the aforementioned objects, and those skilled in the art to which the disclosure pertains may clearly understand other objects from the following descriptions.

To achieve one or more above objects, according to an aspect, the present invention provides a method for wireless communication comprising:

generating, by node, a data packet collected by said node, wherein the data packet has a LoRaWAN-based structure including modified physical payload section and four information fields according to the LoRaWAN communicating protocol which are a preamble, a physical header, a physical header CRC, and a CRC inserted into the data packet automatically, wherein the physical payload section includes a medium access control layer header subsection and a medium access control layer payload subsection, characterized in that:

the medium access control layer header subsection includes a message type information for indicating a type of the data packet, the medium access control layer payload subsection includes a frame header subfield, wherein the frame header subfield includes a device address information which includes a node address of a node generating the data packet and a gateway address of a gateway to which the node generating the data packet communicates, and a frame control information includes an acknowledgement information and a portion reserved for future usage for customizing a frame controlling;

encoding and sending, by the said node, the data packet to the gateway containing the gateway address information which is specified in the said device address information, wherein the gateway communicates only with the server and the node(s) without communicating with other different gateways within the same network;

generating and sending, by the gateway, acknowledgement information to the said node after the gateway has received the said data packet;

decoding, by the gateway, the said data packet sent from the said node for obtaining data collected by the node, and the said data at the gateway for obtaining processed data;

sending, by the gateway, the processed data to the server.

According to an embodiment, the said data processing at the gateway includes, without a limitation of data gathering, carrying out edge computing algorithms, performing artificial intelligence (AI) algorithms (artificial intelligence), or the same.

Alternatively, the gateway communicates with the server via WiFi, Ethernet, 4G LTE, radio, wired communication, wireless communication, or any of their combination.

According to an embodiment, the message type information is 3 bits in length and indicates types of the data packet including a join-request message, a join-accept message, an unconfirmed data message, a confirmed data message, an unconfirmed command message, a confirmed command message, based on the value of the bits.

According to an embodiment, the device address information is 4 bytes in length, 2 bytes for indicating a node address and 2 bytes for indicating a gateway address.

According to an embodiment, the acknowledgement information is 1 bit long.

According to another aspect, the present invention provides a system for wireless communication comprising: a node, a gateway, and a server, wherein the node is configured for:

generating a data packet collected by said node, wherein the data packet has a LoRaWAN-based structure which includes a modified physical payload section and four information fields according to the LoRaWAN communication protocol, which are a preamble, a physical header, a physical header CRC, and a CRC inserted into the data packet automatically, wherein the physical payload section includes a medium access control layer header subsection (MHDR—MAC Header) and a medium access control layer payload subsection, characterized in that:

the medium access control layer header subsection includes a message type information for indicating a type of a data packet, the medium access control layer payload subsection includes a frame header subfield, wherein the frame header subfield includes a device address information which includes a node address of the node generating the data packet and a gateway address of a gateway to which the node generating the data packet communicates, and a frame control information which includes acknowledgement information and a portion reserved for future usage for customizing a frame controlling;

encoding and sending the data packet to the gateway containing the gateway address information specified in the said device address information;

wherein the gateway communicates only with the server and the node(s) without communicating with other different gateways within the same network, the gateway is configured for:

generating and sending and acknowledgment information to the said node after the gateway has received the said data packet;

decoding the said data packet sent from said node for obtaining data collected by the node, and said data at the gateway for obtaining a processed data;

sending the processed data to the server.

According to an embodiment, the said data processing at the gateway includes, without a limitation of, data gathering, carrying out edge computing algorithms, the execution of AI algorithms (Artificial Intelligence), or the same.

Alternatively, the gateway communicates with the server via WiFi, Ethernet, 4G LTE, radio, wired communication, wireless communication, or any of their combination.

According to an embodiment, the message type information is 3 bits in length and indicates types of the data packet including a join-request message, a join-accept message, an unconfirmed data message, a confirmed data message, an unconfirmed command message, a confirmed command message, based on the value of the bits.

According to an embodiment, the device address information is 4 bytes in length, 2 bytes for indicating a node address and 2 bytes for indicating a gateway address.

According to an embodiment, the acknowledgement information is 1 bit long.

According to yet another aspect, the present invention provides a non-transitory computer readable storage medium storing a computer readable program, wherein the computer readable program is configured to implement the method for wireless communication described above.

DESCRIPTION OF EMBODIMENTS

Hereinafter, advantages, efficiencies, and inventive concepts of the present invention shall be understood more clearly through the detail description of the preferred embodiments with reference to the accompanying drawings. However, it is understood that those preferred embodiments are mainly intended for illustrating and descriptive purposes for a person skilled in the art to which the present disclosure pertains, to fully understand the inventive concepts and advantages of the present invention without any limitation on the scope of the present invention to the following described embodiments.

Figure 1:
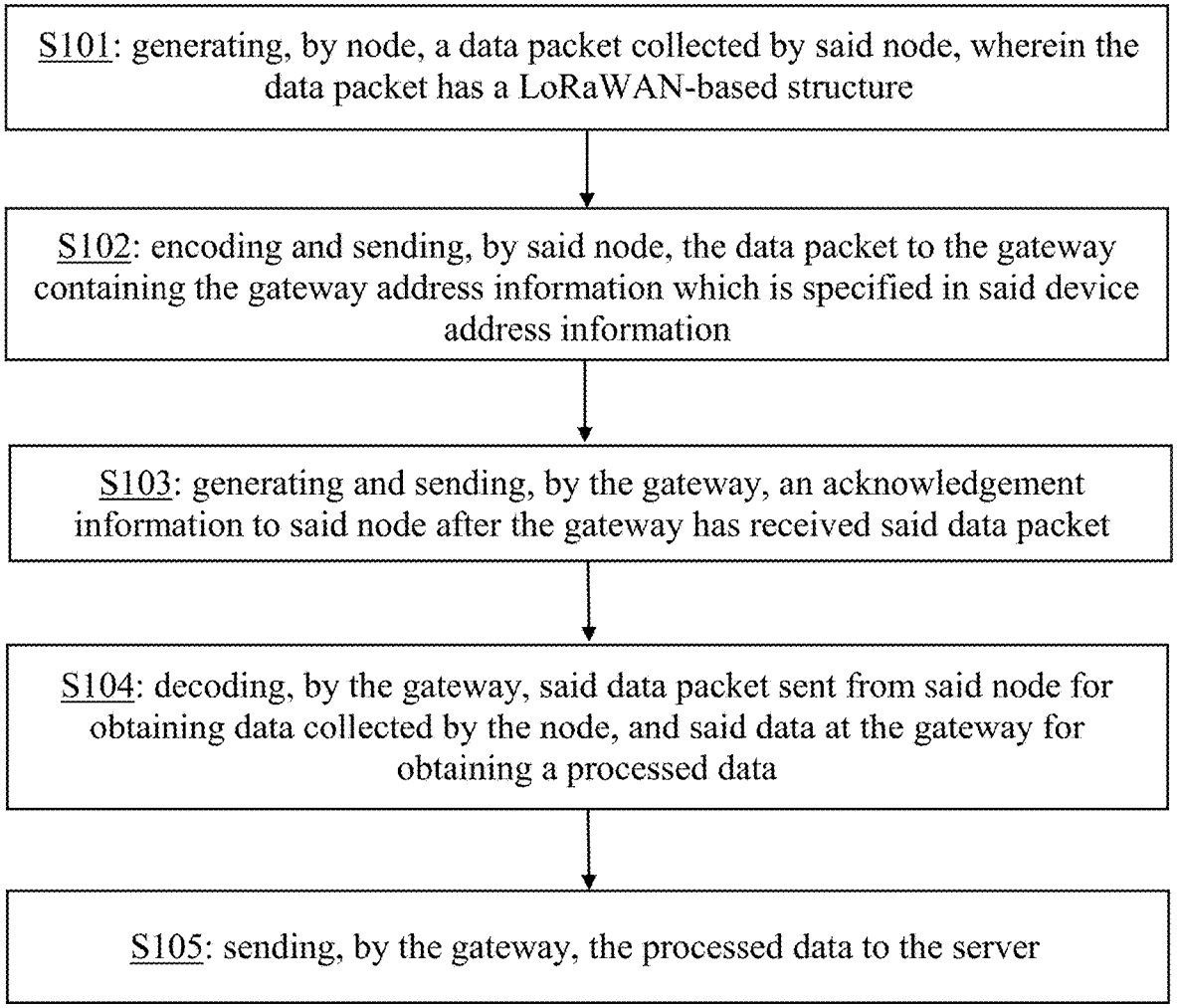
FIG. 1 is a flowchart that illustrates a method for wireless communication according to a preferred embodiment of the present invention.

As shown in FIG. 1, the method for wireless communication (s) according to a preferred embodiment of the present invention, comprising the steps from step S101 to step S105 as described in details as below.

Step S101: generating, by a node, a data packet collected by said node, wherein the data packet has a LoRaWAN-based structure.

In this step, the data packet has the LoRaWAN-based structure which includes a modified physical payload section and four information fields according to the LoRaWAN communicating protocol, which are a preamble, a physical header, a physical header CRC, and a CRC inserted into the data packet automatically.

The physical payload section includes a medium access control layer header subsection and a medium access control layer payload subsection. The medium access control layer header subsection includes a message type information for indicating a type of a data packet. The medium access control layer payload subsection includes a frame header subfield, wherein the frame header subfield includes a device address information which includes a node address of a node generating a data packet and a gateway address of the gateway to which the node generating the data packet communicates, and the frame control information includes an acknowledgement information and a portion reserved for future usage for customizing a frame controlling. Further details of the data packet structure will be described hereafter with reference to FIG. 3.

It should be understood that the term "section/subsection" used in the entire of the present disclosure, such as "header section/subsection" for example, is intended for use to encompass or be equivalent to fields or subfields of layers, sublayers or any component in the structure of the data packet.

Step S102: Encoding and sending, by the said node, the data packet to the gateway that has a gateway address information which is specified in the device address information. Preferably, the gateway communicates only with the server(s) and nodes without communicating with other different gateways within the same network, to be capable to remove the communication procedures between the gateways.

Step S103: Generating and sending, by the gateway, acknowledgement information to the said node after the gateway has received the said data packet.

Step S104: decoding, by the gateway, the said data packet sent from the said node to obtain data collected by the node and the said data at the gateway to obtain processed data.

It is obviously to a person skilled in the art that the gateway according to the preferred embodiment must be known encryption keys related to the encoding data sent from nodes. For example, the gateway has known the network section key (Network Section Key—NwkSKey), the gateway may be known the application section key (Application Section Key—AppSKey), or the gateway may be known the network section key and the application section key, due to practical applications wherein the gateway is required to perform one or more processing tasks, instead of these tasks are performed by a network server, an application server, or both the network server and the application server.

Step S105: sending, by the gateway, the processed data to the server. Thus, the server may be not necessarily to process the processed data again, or only providing some further certain tasks over the processed data. As the result, there may reduce processing requirements for the server.

It is conspicuous that, in the manner to clearly define the addresses of the nodes and the gateway(s) in the structure of a data packet, the relationship between the node and the gateway is the one-to-one relationship. Beside facilitating access and update the status of the node, the gateway may easily recognize to ignore data packets that are not assigned to be sent to the said gateway, which result in reducing several processing tasks, such as the processing task to identify a data packet, for example.

The gateway may be availably equipped with components for performing computing tasks, thus by clearly defining for the gateway to undertake a part of computing, processing tasks in the network may result in requirements reducing at the network server and significantly increasing the efficiency of using the networks resources.

According to several embodiments, the data processing tasks at the gateway may include, without a limitation of data gathering, carrying out edge computing algorithms, the execution of AI algorithms (Artificial Intelligence), or the same.

It is conspicuous that, by processing data at the gateway according to the embodiments, the capacity of data sent from the nodes shall be significantly reduced before sending to the server. Such as in the case there are a plurality of data to be sent to the gateway, which are inputting data of an AI prediction model, for example, instead of forwarding all the inputting data to the server for processing similar to typical solutions, the gateway according to the present invention may only send the data of predicted results given by the AI prediction model to the server. This may result in favorably increasing the efficiency of using the network bandwidth.

In general, the gateway may communicate with the server via any known communicating techniques, for example WiFi, Ethernet, 4G LTE, radio, wired communication, wireless communication, or any of their combination.

According to a preferred embodiment, if the server needs to send commands to the nodes, the server may send command messages to a gateway, and the gateway will send the command messages that contain the content of the commands to the node(s). Preferably, the command message may be sent accompanying with an acknowledgement message. After receiving the command message, the corresponding node will send an acknowledgement message related to the received command sent to the node, to the gateway.

Figure 2:
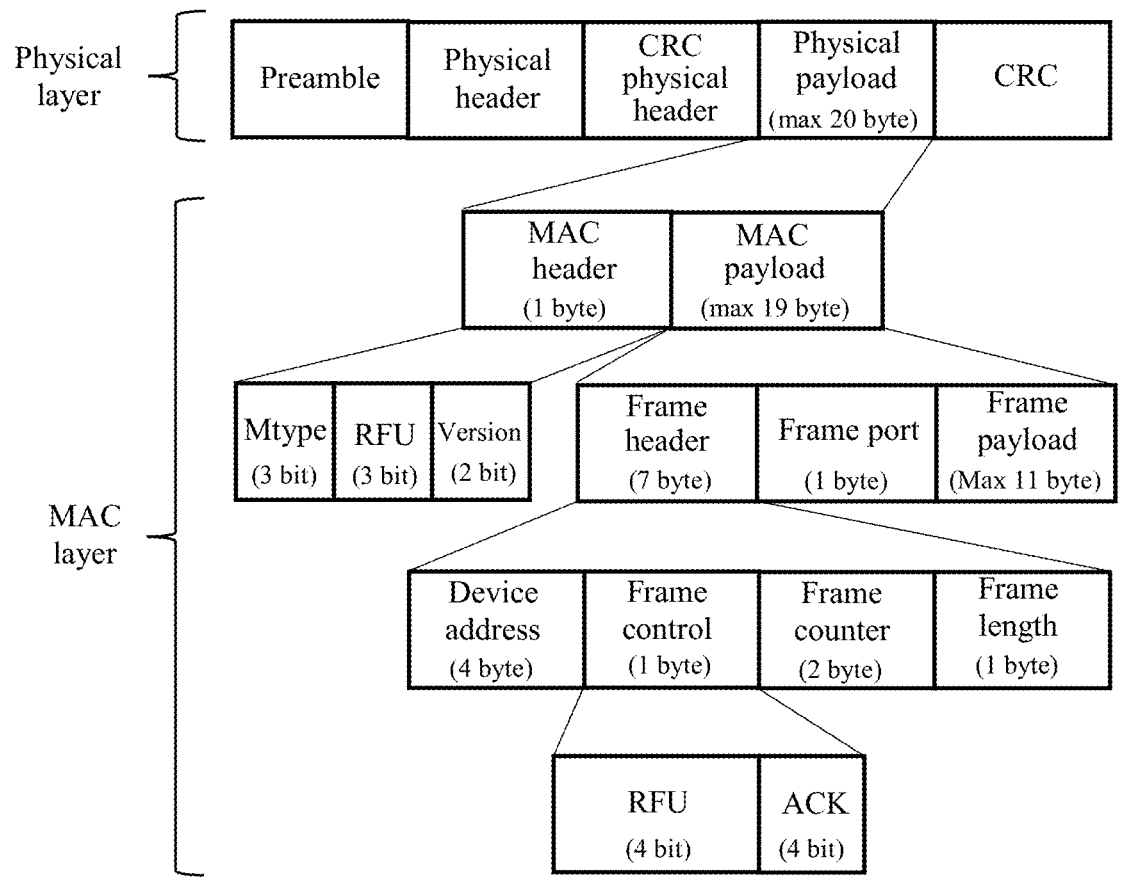
FIG. 2 illustrates the structure of a data packet according to a preferred embodiment of the present invention.

FIG. 2 illustrates the structure of a data packet that is improved based on the LoRaWAN protocol according to an example embodiment of the present invention.

According to the exemplarily embodiment, the data packet has a physical layer which includes a modified physical payload section and four information fields according to the LoRaWAN communicating protocol, which are a preamble, a physical header, a physical header CRC, and a CRC inserted into the data packet automatically. The physical payload section has its length is maximum to 20 bytes. The fields of the preamble, the physical header, the physical header CRC, and CRC have their lengths and characteristics similar to be defined by the LoRaWAN.

The physical payload section includes a MAC (Medium Access Control) header subsection which is 1 byte in length, and a MAC payload subsection which is maximum to 19 bytes in length.

The MAC header subsection includes subfields which are message type (message type—Mtype) is 3 bits in length for indicating the type of the message or the data packet (see Table 1), this is optional that the length of 3 bits are used for reserving for future usage (Reserved for Future Usage—RFU), and the length of 2 bits are used for containing the version of the protocol which is employed.

TABLE 1

List of data packets according to the values of bits of Mtype

| Mtype | Type of the data packet |
|---|---|
| 000 | Join-request message, sent from the nodes |
| 000 | Join-accept message, sent from the gateway |
| 010 | unconfirmed data message, send from the nodes |
| 011 | confirmed data message, sent from the nodes |
| 100 | unconfirmed command message, sent from the gateway |
| 101 | confirmed command message, sent from the gateway |
| 110 | reserved for the future usage |
| 111 | reserved for the future usage |

The MAC payload subsection includes a frame header subfield which is 7 bytes in length, an optional subfield (such as RFU) which is 1 byte in length, and a frame payload subfield which is maximum to 11 bytes in length for containing data of the frame.

The frame header subfield includes a device address part which is 4 bytes in length (2 bytes for indicating a node address and 2 bytes for indicating a gateway address), a frame control part which is 1 byte in length containing the protocol control information, a frame counter part which is 2 bytes in length for indicating the order number of the data packet, and a frame length part which is 1 byte in length for indicating the length of a payload which is contained in the frame.

The frame control part includes an acknowledgement subpart (ACK), which is 4 bits in length and an optional subpart (or RFU), which is 4 bits in length.

Figure 3:
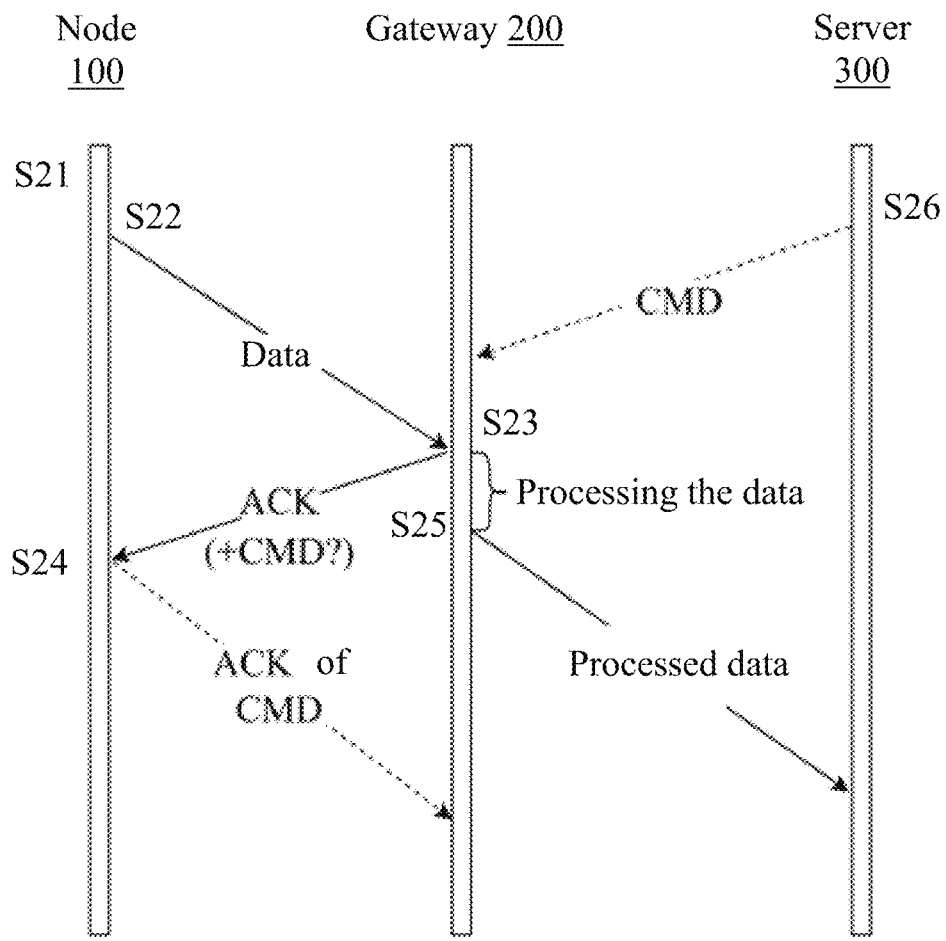
FIG. 3 is a flowchart that illustrates the communication operations of the main components in the network of the system for wireless communication according to a preferred embodiment of the present invention.
Figure 4:
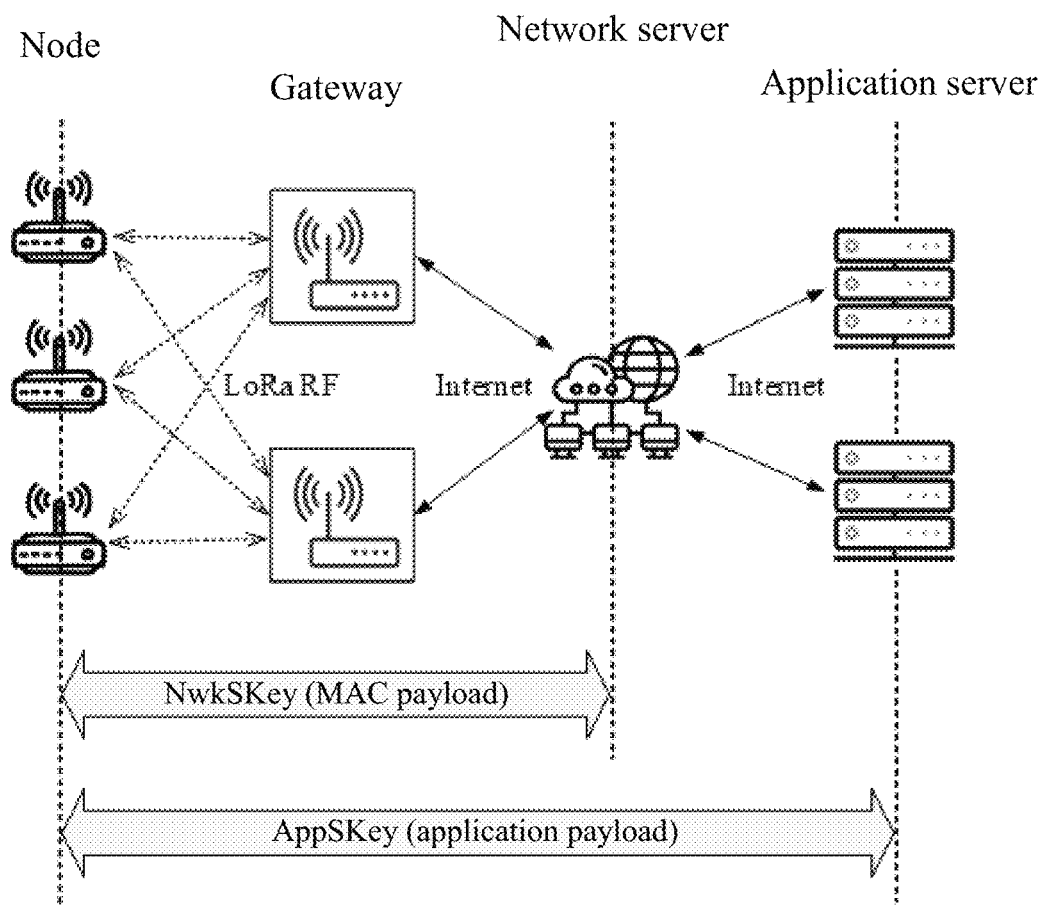
FIG. 4 is a flowchart illustrating the communication operations of the main components in the network of the communication systems based on a typical LoRaWAN protocol.

FIG. 3 is a flowchart that illustrates the communication operations of the main components of the network of the system for wireless communication according to a preferred embodiment of the present invention.

A wireless communication according to the preferred embodiment includes the main components of a node 100, a gateway 200, and a server 300.

It should be understood that 'node' and "gateway" are referred in the entire disclosure substantially by way of representative. That is, although it can only describe or illustrate/refer to 'node(s)' (or one node), "gateway(s)" (or one gateway) or the relationship between the node and the gateway. However, the present invention is not limited to any particular number of node and gateway. The system for wireless communication according to the present invention may include one or more nodes, one or more gateways, and the number of them is not of any limitation, such as, the number of nodes may be up to 50 or 100, or greater, for example.

Similarly, the server may be used to represent a server system and related components of the server system.

According to the preferred embodiment, node 100 is configured to perform at least functions according to the steps of Steps S21, S22, and S24 as described in detail below.

Step S21: generating a data packet which contains data collected by the node 100, wherein the data packet has a LoRaWAN-based structure includes a modified physical payload section and four information fields according to the LoRaWAN communicating protocol which are a preamble, a physical header, a physical header CRC, and a CRC inserted into the data packet automatically.

Similar to above descriptions, the physical payload section includes a medium access control layer header subsection (MHDR—MAC Header) and a medium access control layer payload subsection. The medium access control layer header subsection includes a message type information for indicating a type of a data packet. The medium access control layer payload subsection includes a frame header subfield, wherein the frame header subfield includes a device address information which includes a node address of the node generating the data packet and a gateway address of the gateway to which the node generating the data packet communicates, and the frame control information includes an acknowledgement information and a portion reserved for future usage for customizing a frame controlling.

Step S22: encoding and sending the data packet to the gateway 200 which has the gateway address information which is specified in the device address information above.

Step S24: node 100 sends and acknowledgement (ACK) for the data packet to the gateway 200 after node 100 is received the data packet containing a command (CMD) sent from the server 300 (Step S26) via gateway 200.

Still, according to the preferred embodiment, the gateway 200 only communicates with the server 300 and the node 100 without communicating with other different gateways within the same network, the gateway 200 is configured to perform at least functions according to the steps of step S23, and S25, as described in details below.

Step S23 generates and send an acknowledgement information to node 100 after the gateway 200 received the data packet.

As a subsequent step, the gateway 200 decodes the data packet sent from the node 100 to gather the data collected by the node 100, and processes said data at the gateway to obtain processed data.

It is inherently that the gateway according to the preferred embodiment must be known encryption keys related to the data sent from nodes. The processing task at gateway 200 may include, without a limitation of data gathering, carrying out edge computing algorithms, performing AI algorithms (Artificial Intelligence), or the same.

It is conspicuous that the processing task at the gateway 200 may be optionally installed, changed, or supplemented based upon the applications and requirements in reality.

Step S25: sending the processed data to the server 300.

According to a preferred embodiment, if server 300 needs to send a command to node(s) 100, the server will send a message containing the command (CMD) to the gateway 200 (Step S26), and the gateway 200 will send the message with the command(s) to the node(s) 100 (Step S23), respectively.

As shown in FIG. 3, the message containing the command may be sent accompanying with an acknowledgement message. After receiving the message with command, the corresponding node 100 will send an acknowledgement message related to the command sent to the node, to the gateway 200, the node 100 will perform the task(s) of the command that the node has received.

Due to the data processing task being performed at the gateway 200, the acknowledgement message related to the command sent from the server 300 only needs to be sent to the gateway 200 without forwarding to the server.

In general, the node 100, gateway 200, the server 300, the structure of the data packet, and other components in the network are substantially similar to each other for using in a method for wireless communication or a system for wireless communication according to the present invention. Characteristics are described for the method for wireless communication according to the present invention (the method) are completely suitable to apply for a system for wireless communication according to the present invention (the system) and vice versa. Therefore, some details descriptions which have been described while disclosing the method may intend to be omitted while disclosing the system, and vice versa. However, it should be understood that the system or method according to the present invention may encompass all characteristics which are disclosed regardless the related contents are disclosed accompanying to the system or method according to the present invention.

According to a preferred embodiment, the gateway 200 may be provided similar to typical gateways which are known and using in the network of LoRaWAN.

The gateway 200 may include a feeding energy source using a battery equipped with a converter, a central processing unit (CPU), sensors, storage, RAM, ROM, a LoRaWAN communicating member.

According to an exemplary embodiment, the CPU may use a type of CPU named AM5728, including a LoRa SPI (Serial Peripheral Interface) port to communicate with the LoRaWAN communicating member via a LoRa PCIe (Peripheral Component Interconnect Express) slot. However, the present invention is not limited thereto.

According to a preferred embodiment, the gateway 200 may be equipped with additional functions, such as the functions for gathering data related to the operation of the gateway itself, the environment surrounding the gateway, or gathering additional data according to a certain requirement which may not be processed and/or be communicated independent from the LoRaWAN.

Gateway 200 may have components for connecting to Ethernet, WiFi, ZigBee, USB port, HDMI port, V2X port, or the same component.

According to a preferred embodiment of the present invention, a nontransitory computer readable storage medium storing a computer readable program may be provided, wherein the computer readable program is configured to implement the method for wireless communication described above.

Besides the features as described above, the present invention may be applicable in various different applications, these applications may belong to various different technical fields, such as automated parking stations/cars and vehicle parking stations managing and supervising, vending machine data monitoring, inventory tracking, automobile industry, utility applications, and in any field that requires data report and control, for example.

Due to each certain application and requirement, the nodes, the gateway, and the server may be provided to be suitable. For example, an application for managing and supervising intelligent car/vehicle parking slots in urban city areas, the nodes may be used in a plurality in number and be equipped with types of sensors for identifying the status of empty/occupied parking slots in the urban city areas. In applications for monitoring and supervising environments, the gateway may be integrated into a monitoring station. The gateways may have fewer in number and represent for a certain geographical region, such as a group of wards/communes, districts. The server may represent a relative large geographical region which may include certain geographical regions of the gateways, for example.

Although some embodiments have been described herein. It should be understood that obvious modifications, equivalent arrangements, or variations could be made based on the described embodiments of an ordinary skill in the art. Therefore, all these modifications, equivalents, or variations fall within the protection scope of the claims appended.

What is claimed is:

1. A method for wireless communication comprising:
   generating, by a node, a data packet collected by said node, wherein the data packet has a LoRaWAN-based structure including modified physical payload section and four information fields according to the LoRaWAN (Long Range Wireless Area Network) communicating protocol which are a preamble, a physical header, a physical header CRC (Cyclic Redundancy Check), and a CRC inserted into the data packet automatically, wherein the physical payload section includes a medium access control layer header subsection and a medium access control layer payload subsection, characterized in that:

the medium access control layer header subsection includes a message type information for indicating a type of the data packet, the medium access control layer payload subsection includes a frame header subfield, wherein the frame header subfield includes a device address information which includes a node address of a node generating the data packet and a gateway address of a gateway to which the node generating the data packet communicates, and a frame control information includes an acknowledgement information and a portion reserved for future usage for customizing a frame controlling;

encoding and sending, by said node, the data packet to the gateway containing gateway address information which is specified in said device address information, wherein the gateway communicates only with a server and the node(s) without communicating with other different gateways within the same network;

generating and sending, by the gateway, an acknowledgement information to said node after the gateway has received said data packet;

decoding, by the gateway, said data packet sent from said node for obtaining data collected by the node, and said data at the gateway for obtaining processed data;

sending, by the gateway, the processed data to the server.

2. The method according to claim 1, wherein data processing at the gateway includes, without a limitation of data gathering, carrying out edge computing algorithms, performance of AI algorithms (Artificial Intelligence), or the same.

3. The method according to claim 1, wherein the gateway communicates with the server via WiFi, Ethernet, 4G LTE, radio, wired communication, wireless communication.

4. The method according to claim 1, wherein the message type information is 3 bits in length and indicates types of the data packet including a join-request message, a join-accept message, an unconfirmed data message, a confirmed data message, an unconfirmed command message, a confirmed command message, based on values of the bits.

5. The method according to claim 1, wherein the device address information is 4 bytes in length, 2 bytes for indicating a node address and 2 bytes for indicating a gateway address.

6. The method according to claim 1, wherein the acknowledgement information is 1 bit in length.

7. A system for wireless communication comprising: a node, a gateway, and a server, wherein the node is configured for:

generating a data packet collected by said node, wherein the data packet has a LoRaWAN-based structure which includes a modified physical payload section and four information fields according to the LoRaWAN (Long Range Wireless Area Network) communication protocol, which are a preamble, a physical header, a physical header CRC (Cyclic Redundancy Check), and a CRC inserted into the data packet automatically, wherein the physical payload section includes a medium access control layer header subsection (MHDR-MAC Header) and a medium access control layer payload subsection, characterized in that:

the medium access control layer header subsection includes a message type information for indicating a type of a data packet, the medium access control layer payload subsection includes a frame header subfield, wherein the frame header subfield includes a device address information which includes a node address of the node generating the data packet and a gateway address of a gateway to which the node generating the data packet communicates, and a frame control information which includes acknowledgement information and a portion reserved for future usage for customizing a frame controlling;

encoding and sending the data packet to the gateway containing gateway address information specified in said device address information;

wherein the gateway communicates only with the server and the node(s) without communicating with other different gateways within the same network, the gateway is configured for:

generating and sending and acknowledgment information to said node after the gateway has received said data packet;

decoding said data packet sent from said node for obtaining data collected by the node, and said data at the gateway for obtaining a processed data;

sending the processed data to the server.

8. The system according to claim 7, wherein data processing at the gateway includes, without a limitation of data gathering, carrying out edge computing algorithms, performing AI algorithms (Artificial Intelligence), or the same.

9. The system according to claim 7, wherein the gateway communicates with the server via WiFi, Ethernet, 4G LTE, radio, wired communication, wireless communication.

10. The system according to claim 7, wherein the message type information is 3 bits in length and indicates types of the data packet including a join-request message, a join-accept message, an unconfirmed data message, a confirmed data message, an unconfirmed command message, a confirmed command message, based on values of the bits.

11. The system according to claim 7, wherein the device address information is 4 bytes in length, 2 bytes for indicating a node address, and 2 bytes for indicating a gateway address.

12. The system according to claim 7, wherein the acknowledgement information is 1 bit in length.

13. A nontransitory computer readable storage medium stores a computer readable program, wherein the computer readable program is configured to implement the method according to claim 1.

* * * * *